United States Patent Office 3,422,932
Patented Jan. 21, 1969

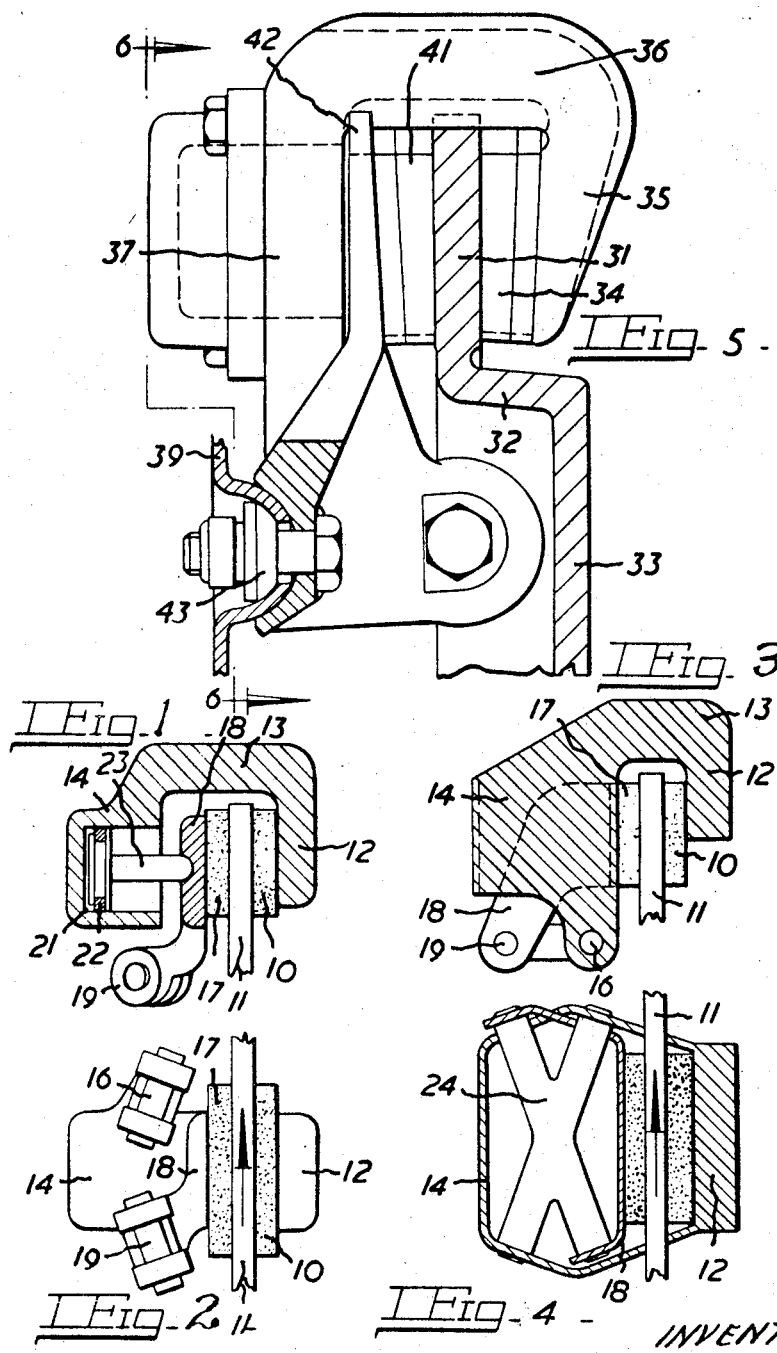

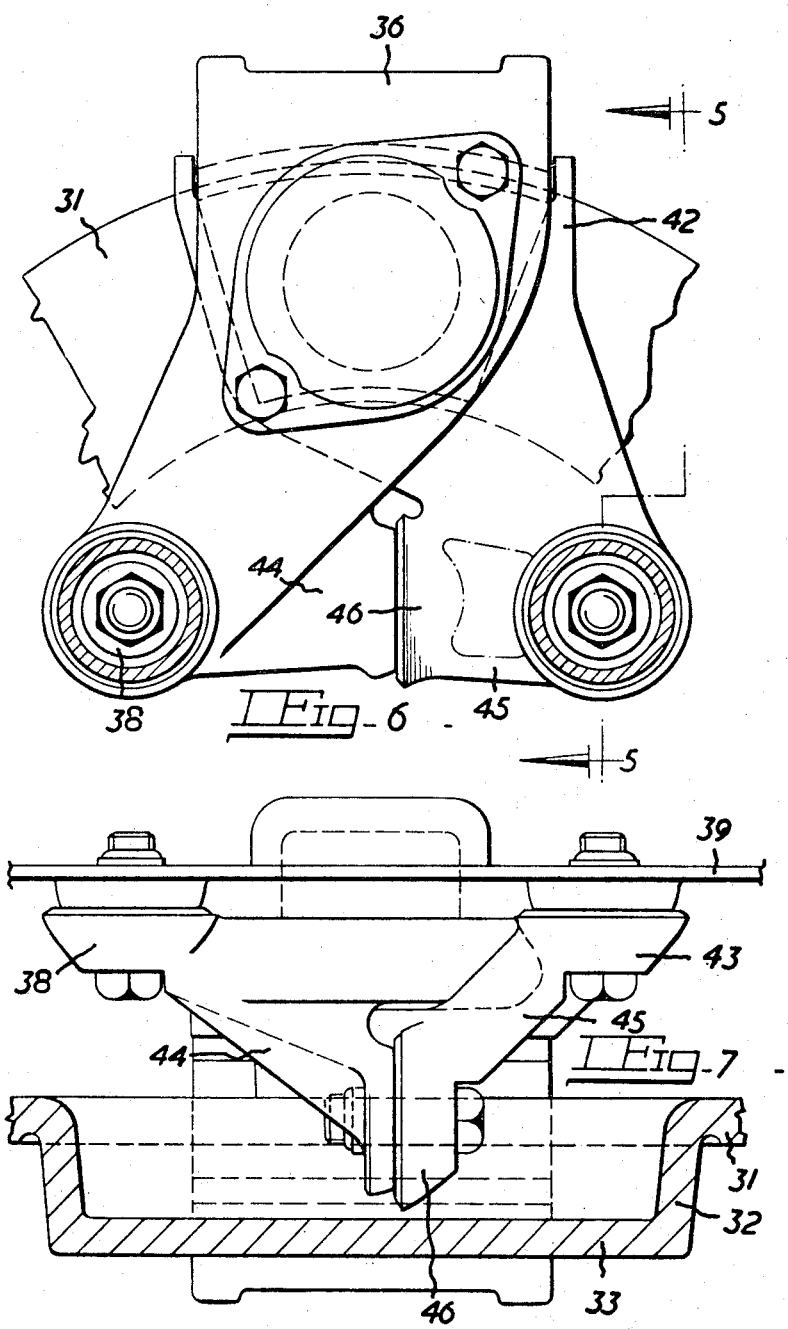

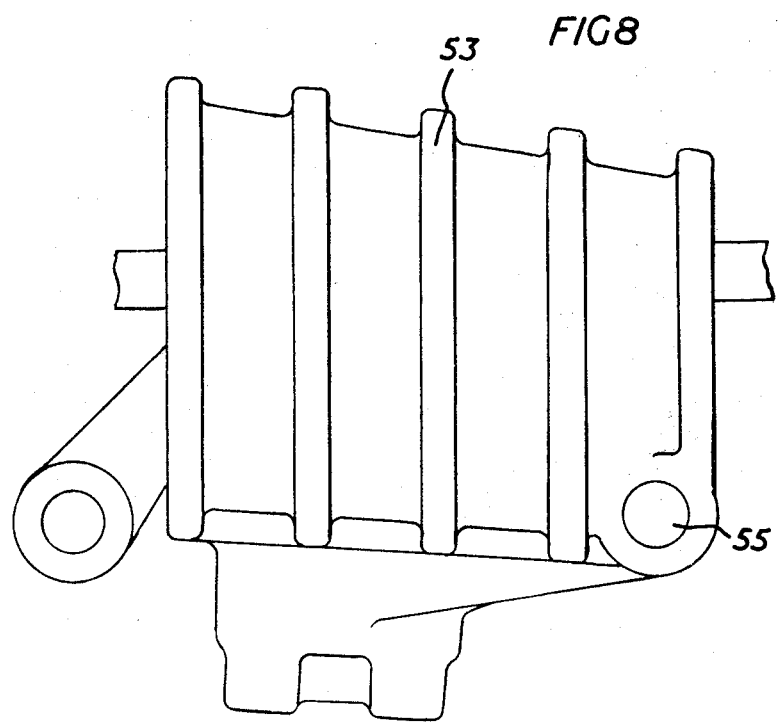
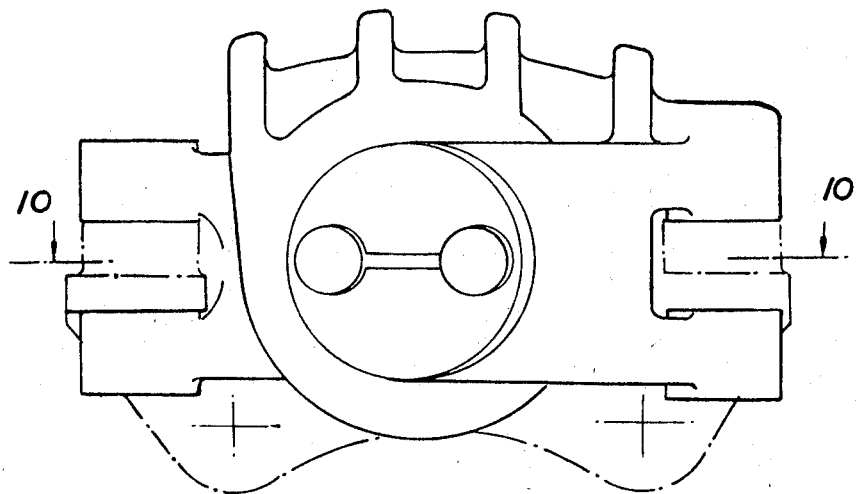

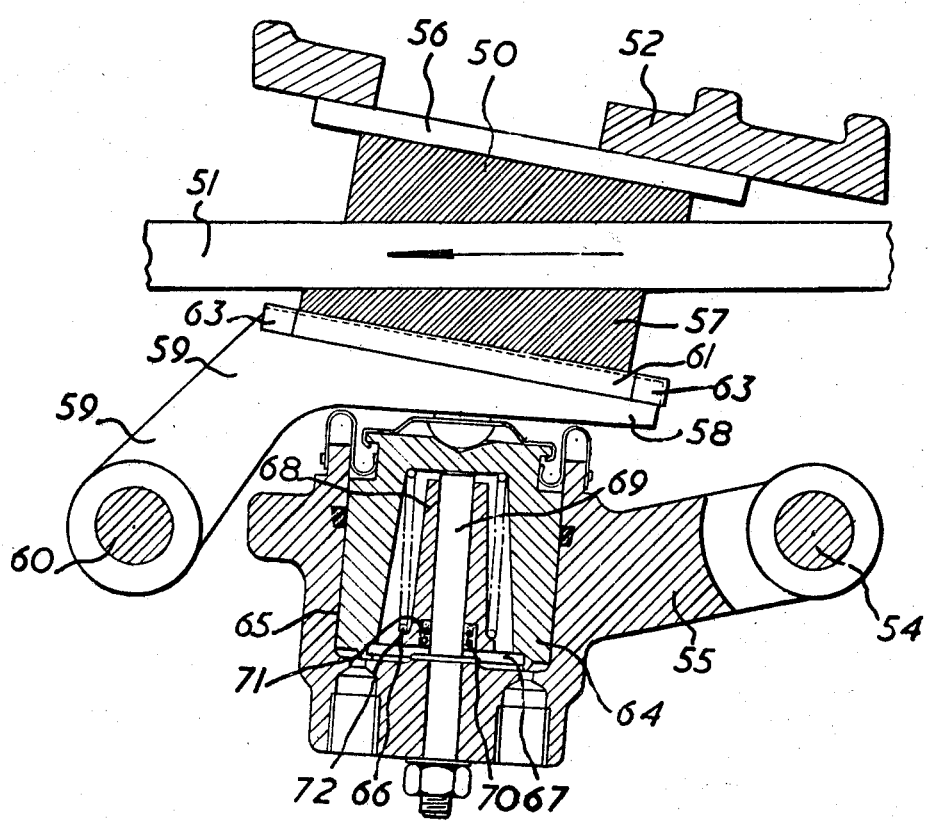

3,422,932
SELF-ENERGIZING DISC BRAKE
Alexander John Wilson, Sutton Coldfield, and Peter Charles Ingham, Blackheath, England, assignors to Girling Limited, Birmingham, England, a British company
Filed Feb. 18, 1964, Ser. No. 345,702
Claims priority, application Great Britain, Mar. 6, 1963, 8,879/63; Mar. 23, 1963, 11,615/63
U.S. Cl. 188—73      16 Claims
Int. Cl. F16d 55/14

ABSTRACT OF THE DISCLOSURE

The invention relates to a self-energizing disc brake having a stationary torque sustaining member solely on one side of the disc and a pair of circumferentially spaced pivots on said stationary member for arms carrying brake pads engageable in substantial opposition to each other with the opposite sides of the discs. The pivots for the arms are positioned in directions with respect to the brake pads such that engagement of the pads with the disc while rotating in one direction produces a servo action on each of the pads to urge them with increased braking effort towards the disc.

---

The invention relates to improvements in brakes of the kind in which friction pads are adapted to be brought into engagement with opposed braking surfaces on a rotatable member such as a disc or drum.

In one known brake of this kind one friction pad is guided in a caliper for movement towards and away from the rotatable member and is actuated by means located in or on the adjacent limb of the caliper while the other pad is mounted on the inner face of the other limb of the caliper and is applied to the rotatable member by the reaction on the caliper.

According to our invention, in a brake of the kind set forth the friction pads are carried by separate members independently mounted for angular movement about circumferentially spaced pivots.

In one arrangement one member is in the form of a caliper which straddles the periphery of a disc. One limb of the caliper carries a friction pad for engagement with the face of the disc on the other side from the pivots and the other limb of the caliper incorporates means for applying to the disc a friction pad carried by the second member.

The second member may comprise a backing plate on which a friction pad is mounted and which has an extension to receive a pivot, the backing plate portion being located between the disc and the applying means located in the first member. The friction pad may be bonded directly to the member or it may be bonded to a separate backing plate received between spaced lugs on the member so that the friction pad can be readily replaced when worn.

Some embodiments of our invention are illustrated by way of example in the accompanying drawings in which:

FIGURE 1 is a diagrammatic vertical cross-sectional view of one form of brake in accordance with our invention;

FIGURE 2 is an inverted plan view;

FIGURE 3 is a vertical cross-section of a modified form of brake;

FIGURE 4 is an inverted plan view of the brake shown in FIGURE 3;

FIGURE 5 is an end view of a brake in part section on the line 5—5 of FIGURE 6;

FIGURE 6 is a side elevation in part section on the line 6—6 of FIGURE 5;

FIGURE 7 is a plan of the brake shown in FIGURES 5 and 6;

FIGURE 8 is a plan view of another form of brake;

FIGURE 9 is a side elevation of the brake shown in FIGURE 8;

FIGURE 10 is a section on the line 10—10 of FIGURE 9.

In the brake illustrated in FIGURES 1 and 2 a friction pad 10 adapted to engage one face of a rotatable disc 11 is mounted on the inner face of one limb 12 of a caliper 13 which straddles a portion of the periphery of the disc.

The other limb 14 of the caliper has an inward extension 15 by means of which it is mounted to swing about a fixed pivot 16 of which the axis is inclined at an acute angle to the plane of the disc as shown more particularly in FIGURE 3.

A second friction pad 17 adapted to engage the other face of the disc is carried by an arm 18 which is mounted to swing about a fixed pivot 19 of which the axis is inclined with respect to the plane of the disc at the same angle as the pivot 16 but in the opposite direction.

An hydraulic cylinder 21 of which the axis is substantially at right angles to the plane of the disc is located in the limb 14 of the caliper, and a piston 22 working in the cylinder acts through a thrust rod 23 on the arm 18.

When fluid under pressure is supplied to the outer end of the cylinder the piston acting on the arm 18 urges the friction pad 17 into engagement with the adjacent face of the disc and the reaction on the caliper brings the friction pad 10 into engagement with the opposite face of the disc.

The disc normally rotates in the direction indicated by the arrow in FIGURE 2, and the directions of the inclinations of the pivots 16 and 19 are such that when the brake is applied the torque or drag on the friction pads cause the limb 12 of the caliper and the arm 18 to swing inwardly towards the disc and so increase the force with which the pads are applied to the disc.

In a modification of the above arrangement shown in FIGURES 3 and 4 the caliper and the member 18 carrying the second friction pad are mounted to swing about a common stationary member 24 of cruciform shape with its crossing limbs inclined at an acute angle to each other and to the plane of the disc and lying in a plane parallel to the axis of the disc.

In the brake shown in FIGURES 5, 6 and 7 the disc 31 is formed by a radial flange extending outwardly from an axially extending flange 32 on a carrier plate 33 offset axially from the disc and adapted to be mounted on a rotatable shaft or the like.

A friction pad 34 adapted to engage one face of the disc is mounted on the inner face of one limb 35 of a caliper 36 which straddles a portion of the periphery of the disc. The other limb 37 of the caliper is extended inwardly and circumferentially and is mounted by means of a part-spherical bearing 38 on a stationary torque-taking member 39 which is spaced axially from the plane of the disc.

A second friction pad 41 adapted to engage the other face of the disc is carried by an arm 42 which is mounted by means of a part-spherical bearing 43 on the member 39.

The geometrical centres of the bearings 38 and 43 lie in a plane parallel to the plane of the disc and are offset circumferentially in opposite directions at equal distances from a radial plane containing the axis of the disc and the axis of an hydraulic cylinder located in the limb 37 of the caliper. A piston working in the cylinder is adapted to engage the arm 42 to urge the friction pad 41 into engagement with the adjacent face of the disc and the reaction on the caliper brings the other friction pad 34 into engagement with the opposite face of the disc.

The limb 37 of the caliper and the arm 42 have integral extensions 44 and 45 which extend towards each other and towards the plane of the disc and are coupled at their free ends by a universal coupling 46. The centre of the coupling lies in or close to the central plane of the disc as shown more particularly in FIGURES 5 and 7.

The lines joining the centres of the bearings 38 and 43 to the centre of the universal coupling 46 form pivotal axes for the caliper and the arms and these axes are oppositely inclined at substantially equal acute angles to the plane of the disc.

The directions of inclination of the axes are such that when the brake is applied the torque or drag forces on the friction pads have components which urge the arm 42 and the limb 35 of the caliper towards the disc to increase the force with which the friction pads are applied to the disc.

In any of the forms described above the application of the brake may be effected by mechanical means instead of by an hydraulic cylinder and piston.

In the brake illustrated in FIGURES 8, 9 and 10, a friction pad 50 adapted to engage one face of a rotatable disc 51 is mounted on the inner face of one limb 52 of a caliper 53 which straddles a portion of the periphery of the disc and the caliper is mounted to swing about a fixed pivot 54 in the other limb 55 at the end of the caliper with which any given point in the braking path first comes into alignment in the normal forward direction of rotation of the disc and of which the axis is parallel to the plane of the disc.

The friction pad 50 is mounted on a backing plate 56 which at one end is in sliding engagement with a part of the caliper and at the other end is retained by a cotter pin or the like (not shown), the pad and backing plate after removal of the cotter pin being detached by sliding the other end out of engagement with the caliper and then moving the pad and backing plate circumferentially.

Alternatively the friction pad 50 may be bonded directly to the inner face of the limb.

The second friction pad 57 adapted to engage the opposite face of a rotatable disc 51 is mounted on an arm 58 located between the disc and the limb 55 of the caliper and the arm 58 has an extension 59 mounted to swing about a fixed pivot 60 of which the axis is parallel to the plane of the disc. The friction pad 57 may be bonded or otherwise secured directly to the member 58 or as illustrated it is bonded to a separate backing plate 61 received between spaced lugs 63 on the member so that the friction pad can be readily replaced when worn.

The friction pad 57 may be applied to the disc by hydraulic or mechanical actuating means located in the limb 55 of the caliper.

In the arrangement shown in FIGURE 10, the friction pad 57 is applied by a piston 64 working in an hydraulic cylinder 65. The piston 64 has an axial recess 66 in its outer end and a washer 67 mounted in the rear end of the recess carries a sleeve 68 sliding on an axial guide rod 69 extending forwardly from the closed end of the cylinder. An annular recess 70 in the sleeve 68 houses a helical spring 71 frictionally gripping the rod 69, the axial lengths of the spring and of the recess differing by an amount equal to the desired clearance to be maintained between the friction pads and the disc in the off position of the brake.

A compression spring 72 is located between the piston and the sleeve to absorb "knock-back" of the piston by the disc.

When fluid under pressure is supplied to the outer end of the cylinder the piston acting on the arm 58 urges the friction pad 57 into engagement with the adjacent face of the disc and the reaction on the caliper brings the friction pad 50 into engagement with the opposite face of the disc.

The disc normally rotates in the direction indicated by the arrow in FIGURE 10, and the pivot 60 about which the extension 59 of the arm 58 is angularly movable is vertical and spaced from but parallel to the plane of the disc, the pivot axis being displaced circumferentially in a trailing direction from the pad to the side of a vertical plane containing the axis of the disc towards which the surface of the disc moves in the normal direction of rotation. The pivot 54 about which the caliper 53 is angularly movable lies on the same side of the disc as the pivot 60 and is displaced circumferentially in a leading direction from the pad 57 to the opposite side of the vertical plane containing the axis of the disc from the pivot 60.

As the arm 58 and the caliper 53 carrying the friction pads are angularly movable about pivots which are spaced from the disc, when the brake is applied with the disc rotating in its normal forward direction the frictional engagement between the pads and the disc cause the arm 58 and the limb 52 of the caliper to swing inwardly about their pivots towards the disc to give a servo or self-energising action and so increase the force with which the pads are applied to the disc.

The friction pads may be of uniform thickness, but preferably, as illustrated, they are tapered in thickness, the tapering being in such a direction that the backing plates 56 and 61 or the limb 52 of the caliper and the arm 58, are initially parallel though at an angle to the disc, and they will remain parallel if the pads wear at equal rates.

Where the pads are tapered in thickness, they are offset circumferentially to a small extent so that their centres of pressure are substantially in axial alignment. The engagement between the piston 64 working in the hydraulic cylinder 65 and the arm 58 is preferably so located that there is a minimum relative movement in a transverse direction between the cooperating surfaces as the arm 58 and the caliper 53 swing in arcs about their respective pivots.

An important advantage of our improved brake in any of the forms described above is that each pivot is only required to take part of the total torque when the brake is applied, whereas in the usual disc brake of the caliper type one or other of the abutments has to take the whole of the torque according to the direction of rotation of the disc.

Our invention is applicable both to disc brakes in which the caliper straddles the outer periphery of a disc mounted on and rotating with a shaft or the like and to brakes in which the caliper straddles the inner periphery of a ring carried by and extending radially inwards from a wheel rim, bell housing or other rotatable member.

In any of the forms of brake described above the pads may be mounted on the members so that they are allowed to rock or articulate to a certain extent out of their normal planes to accommodate deflections of the disc and to ensure substantially uniform wear of the pad over the whole of its area when the brake is applied. This is achieved by providing only a small area of contact between each friction pad or backing plate and the limb of the caliper and the swinging arm.

The small area of contact between the caliper and its friction pad or backing plate is formed by a protuberance on the backing plate or friction pad or on the surface of the caliper limb with which the friction pad or backing plate engages and preferably the protuberance has a flat surface although it may be concave.

In the case of the pad carried by the swinging arm, a similar protuberance may be provided on the piston or other actuator located in the caliper, or the inner end of the piston may be made of suitably small area.

We claim:
1. In a brake the combination of a rotatable disc having first and second opposite sides, a non-rotatable torque member mounted adjacent the first side of said disc, a first friction pad pivotally mounted to said torque member solely on the first side of said disc and adapted to engage the second side of said disc, said pivotal mounting being in a trailing direction from said friction pad in relation to the normal direction of rotation of said disc, a second friction pad pivotally mounted to said torque member solely on said one side of said disc and adapted to engage the first side of said disc in substantially opposed relationship to said first friction pad, said pivotal mounting of said last named friction pad being circumferentially spaced from said first pivotal mounting in a leading direction from said second friction pad in relation to the normal direction of rotation of said disc, actuation means operatively affixed to one of said friction pads and operatively engaging the other of said friction pads so that when said actuation means is actuated both friction pads are brought into opposed engagement with their respective surfaces of said disc with substantially equal, but opposite force.

2. In a brake, a rotatable disc, a non-rotatable torque member mounted solely to one side of said disc, a lever pivotally mounted at one end to said torque member with the other end of said lever extending in a substantially leading direction in relation to the normal direction of rotation of said disc, a first friction pad operatively affixed to said other end of said lever and adapted to engage the surface of said disc opposite said torque plate, a second lever pivotally mounted at one end to said torque member in circumferentially spaced relation to said first lever and with the other end of said second lever extending in a substantially trailing direction in relation to the normal direction of rotation of said disc, a second friction pad operatively affixed to said second lever arm at said other end thereof and adapted to engage the surface of said disc on the side thereof as said torque member in substantially opposite relationship to said first friction pad, and actuation means operatively carried by one of said levers and operatively engaging the other of said levers so that said friction pads are forced against the respective surfaces of said discs with equal and opposite forces when said actuation means is actuated.

3. A brake comprising a rotatable disc presenting opposed friction surfaces, first and second friction elements located on opposite sides of said disc for engagement with said friction surfaces, a stationary member located solely on one side of said disc, an arm member carrying said first friction element, and having a pivotal connection with said stationary member on said one side of the disc and about which said arm member is angularly movable, said pivotal connection being displaced circumferentially relative to the disc from the centre of pressure of the first friction element in a direction in which engagement of the first friction element with the friction surfaces produces a servo-action upon rotation of the rotatable braking member in one direction, a second arm member carrying said second friction element, and having a second pivotal connection with said stationary member on said one side of the disc and about which said second arm member is angularly movable, said second pivotal connection being displaced circumferentially from said first pivotal connection relative to the disc and from the centre of pressure of the second friction element in a direction in which engagement of said second friction element with the friction surface on the opposite face of the disc produces a servo-action upon rotation of said disc in said one direction, and means for applying said friction elements to said opposed friction surfaces of said rotatable member.

4. A disc brake as claimed in claim 3, wherein the pivotal connections are spaced on opposite sides of a radius of the disc containing the centers of pressure of the friction pads.

5. A disc brake as claimed in claim 3, wherein the axis of the pivotal connection about which each of the arm members is mounted for angular movement is inclined at an acute angle to the direction of the movement of the surface of the disc with which the pad carried by that are member engages, the direction of inclination being such that when the brake is applied with the disc rotating in its normal forward direction the drag between the pad and the disc increases the force with which the pad is applied to the disc.

6. A disc brake as claimed in claim 3, wherein the axes of the pivotal connections about which the arm members are mounted for angular movement are oppositely inclined at acute angles to the plane of the disc, the directions of inclination of the axes being such that when the brake is applied with the disc rotating in its normal forward direction the drag on the friction pads increases the force with which they are applied to the disc.

7. A disc brake as claimed in claim 3, wherein the axes of the pivotal connections about which the arm members are mounted for angular movement are vertical and spaced from but parallel to the plane of the disc on said one side thereof so that when the brake is applied with the disc rotating in its normal forward direction the drag on the friction pads increses the force with which they are applied to the disc.

8. A disc brake as claimed in claim 3, in which one of the arm members carrying a friction pad is a caliper which straddles a portion of the periphery of the disc and has limbs on opposite sides of the disc, and the other is an arm which is located between the disc and one limb of the caliper, said limb carrying means for urging the arm towards the disc.

9. A disc brake comprising a rotatable disc, braking surfaces on opposite sides of said disc, first and second friction pads located on opposite sides of said disc for engagement with said braking surfaces, a stationary part solely on one side of the disc, a rigid caliper straddling a portion of the periphery of the disc and having limbs on opposite sides of the disc, a first single pivotal connection on said one side of the disc between one limb of the caliper and the stationary part and on which the caliper is mounted for angular movement relative to the disc said first friction pad being mounted on the other limb of the caliper, an arm carrying said second friction pad and located between said disc and said one limb of said caliper, a second single pivotal connection between said arm and the stationary part and about which said arm is angularly movable, and means carried by said one limb of said caliper for urging said second friction pad carried by said arm into engagement with said disc, the reaction on said caliper bringing said first friction pad carried by the caliper into engagement with the opposite face of the disc, said pivotal connections being spaced circumferentially from each other with respect to said rotatable disc and constructed and arranged that on engagement of said friction pads with said disc when said disc is rotating in one direction the drag force on each friction pad produces a servo action on each of said friction pads to urge one pad towards the disc independently of the other and vice versa.

10. A disc brake as claimed in claim 9, wherein the arm comprises a backing plate having an extension to receive the pivotal connection about which the arm is angularly movable and the friction pad is secured directly to the backing plate.

11. A disc brake as claimed in claim 9, wherein the arm has an extension to receive the pivotal connection about which the arm is angularly movable and the friction pad carried by the arm is secured to a backing plate received between spaced lugs on the arm.

12. A disc brake as claimed in claim 9, wherein the means for urging the friction pad carried by the arm into engagement with the disc comprise a piston working in an hydraulic cylinder and the piston incorporates means for maintaining a desired clearance between the friction pads and the disc in the off position of the brake.

13. A disc brake as claimed in claim 9, wherein the friction pads are tapered in thickness and offset circumferentially so that their centres of pressure are substantially in alignment.

14. A disc brake comprising a rotatable disc, braking surfaces on opposite sides of said disc, first and second friction pads located on opposite sides of the disc for engagement with said braking surfaces, a stationary part solely on one side of the disc, a first arm carrying said first friction pad, a second arm carrying said second friction pad, a first pivotal mounting between said first arm and said stationary part on said one side of said disc, a second pivotal mounting between said second arm and said stationary part on said one side of the disc, each mounting providing freedom of movement about two intersecting axes, means connecting the arms and allowing limited freedom to articulate so that each arm is free to pivot about an axis which is formed by a line joining the centre of the mounting for said arm to the centre of said connecting means and which is inclined at an acuate angle to the plane of the disc, said pivotal mountings being spaced from each other circumferentially and being constructed and arranged with respect to said disc that on engagement of said friction pads with said disc when said disc is rotating in one direction the drag force on each friction pad produces a servo action on each of said friction pads to urge one towards the disc independently of the other and vice versa.

15. A disc brake as claimed in claim 14, wherein which the arms are mounted on the stationary part by means of circumferentially spaced part-spherical joints of which the axes lie in a plane parallel to the plane of the disc and the centre of the coupling means lies in or close to the plane of the disc.

16. A disc brake as claimed in claim 15, wherein one of the arms comprises a caliper which straddles a portion of the periphery of the disc and of which one limb is mounted on a stationary part and incorporates actuating means adapted to act on the other arm.

References Cited

UNITED STATES PATENTS

| | | | |
|---|---|---|---|
| 2,663,384 | 12/1953 | Chamberlain | 188—73 |
| 2,787,340 | 4/1957 | Murphy | 188—76 |
| 3,098,545 | 7/1963 | Murphy | 188—76 |
| 3,141,527 | 7/1964 | Henderson | 188—73 |
| 3,150,745 | 9/1964 | Eksergian | 188—73 |
| 3,141,528 | 7/1964 | Henderson | 188—73 |
| 2,835,350 | 5/1958 | Butler | 188—73 |
| 3,199,634 | 8/1965 | Chouings | 188—73 |

FOREIGN PATENTS

| | | |
|---|---|---|
| 1,195,739 | 5/1959 | France. |
| 1,156,664 | 10/1963 | Germany. |
| 1,002,208 | 2/1957 | Germany. |

GEORGE E. A. HALVOSA, *Primary Examiner.*